Patented Oct. 31, 1944

2,361,715

UNITED STATES PATENT OFFICE 2,361,715

METHOD OF PREPARING UREA-FORMALDEHYDE LACQUERS

Robert C. Swain, Riverside, and Pierrepont Adams, Stamford, Conn., assignors to American Cyanamid Company, New York, N. Y., a corporation of Maine No Drawing. Application November 19, 1940, Serial No. 366,258

2 Claims. (Cl. 260—42)

This invention relates to a new and improved method of preparing lacquers from urea and formaldehyde.

Urea-formaldehyde lacquers are commonly prepared by condensing urea with an aqueous solution of formaldehyde, refluxing the condensation product with a primary alcohol in the presence of an acid, and then removing the water of solution and condensation by azeotropic distillation. This distillation is a time-consuming step which adds considerably to the cost of the process.

The use of ordinary aqueous formaldehyde of 30% strength in the process requires the removal of considerable quantities of water by distillation and because of the heating and long period of time required for distillation makes the control of viscosity of the resinous solution difficult. Formaldehyde solutions of 37-40% concentration are readily obtainable on the market but solutions of this strength are unstable and require the presence of a stabilizer to prevent formation of a precipitate of paraformaldehyde. Methanol in amounts of 8-12% is commonly used as the stabilizer. The presence of methanol is objectionable, however, for several reasons. It appears to reduce somewhat the reaction rate of the urea-formaldehyde condensation and, more important, its use in the formaldehyde solution leads to the formation of a ternary distillate of methanol, water and organic solvent from which it is difficult to recover the organic solvent for reuse in the distillation by ordinary fractionation methods. Solutions of formaldehyde of greater than 40% strength cannot be stabilized with methanol. The use of paraformaldehyde has been suggested but, while the dehydration of the lacquer is facilitated somewhat, the high cost of paraformaldehyde limits the use of this material to specific cases.

In our copending application Serial No. 306,516 filed November 28, 1939, now Patent 2,237,092, dated April 1, 1941, we describe a method of stabilizing formaldehyde by the addition thereto of melamine or methylol melamines in amounts of about 1-10%. As pointed out in that application it is possible to obtain stable solutions of formaldehyde containing up to 50% formaldehyde by the simple expedient of dissolving therein melamine or methylol melamines. The melamine may be dissolved in the aqueous formaldehyde solution preferably by adding the melamine and heating to 60-80° C. for a short time. 1% of melamine dissolved in a formaldehyde solution will have a definite stabilizing effect while 6% of melamine can stabilize a 50% solution of formaldehyde for a period of many months even when stored at low temperatures. Although it is possible to dissolve more than 10% of melamine in aqueous formaldehyde it is in general not desirable to do so because of the possible formation of a gel as described in our copending application.

By using formaldehyde stabilized with melamine we find that the initial condensation between the urea and formaldehyde takes place more rapidly due, probably, to the absence of methanol which appears to inhibit the reaction. We also find that when alcohols partially immiscible with water are used the azeotropic distillate obtained in the dehydration step separates sharply and at once into two layers which greatly simplifies the recovery of the organic solvent fraction. When using, for example, butanol as the organic solvent in the azeotropic distillation we find that the distillate separates into two layers, one composed of water containing approximately 8% butanol and the other layer containing approximately 80% butanol and 20% water. We are thus enabled to return the butanol fraction directly to the reaction vessel without an intermediate fractionation step. When methanol is present, as from methanol-stabilized formaldehyde, the methanol acts as a mutual solvent for the water and butanol and makes it difficult to reuse the butanol in the azeotropic distillation without first removing water and methanol from the same. This is an expensive step which is entirely obviated by the use of our methanol-free, melamine-stabilized formaldehyde.

When using formaldehyde solutions of 40-50% strength, as we prefer to do, we find that the more concentrated formaldehyde reduces considerably the time required for the urea-formaldehyde reaction to take place. We also find that we are enabled to obtain a larger production capacity from our reaction vessels. Further, due to the presence of considerably smaller quantities of water, the azeotropic distillation is shortened as to time and simplified in procedure. Because the dehydration step is shortened the urea resin in the lacquer is not reacted to so great an extent and it is possible to obtain resin solutions which have a lower viscosity for a comparative solids content.

From the foregoing discussion it is evident that melamine-stabilized formaldehyde solutions, particularly those of 40-50% formaldehyde content, may be employed to advantage in the manufacture of urea-formaldehyde lacquers by any known or approved method in which a primary alcohol is used. We may react urea with our improved formaldehyde solutions under neutral or slightly alkaline conditions such as, for example, a pH of 7-8 for a period of time and then add a primary alcohol and an acid catalyst and complete the reaction by heating the solution at a pH of from 2 to 6 and then remove the water of solution and condensation by an azeotropic distillation. If desired the urea, formaldehyde, primary alcohol and acid catalyst may be charged into the reaction vessel and the entire reaction completed at a pH of the order of 2 to 6. Any of the acid catalysts now in use, such as phosphoric acid, phthalic acid and the like may be used for this purpose. Similarly any primary alcohol may be used, such as ethanol, butanol or benzyl alcohol, in accordance with present practice.

The following specific examples illustrate in greater detail these alternative methods but are not to be understood as limiting our invention solely thereto since they are given merely to aid in more fully understanding the manner of carrying out our present invention.

Example 1

209 parts of a 50% solution of formaldehyde stabilized with 7% melamine, were adjusted to a pH of 7.0 with a dilute solution of NaOH and mixed with 54 parts of urea and the mixture was heated under reflux for 30 minutes. The pH of the solution was kept at 7.0 during this time by frequent adjustments with dilute NaOH. 200 parts of butanol were then added and the heating continued for 40 minutes more, whereupon there were slowly added 200 parts of butanol followed by the addition of 200 parts of butanol containing 0.27 part of $H_3PO_4$ over a period of 35 minutes. The total refluxing time was 1 hour and 45 minutes. The reaction vessel was then arranged for distillation. The resinous solution was then dehydrated by means of azeotropic distillation wherein water and butanol were distilled off. Butanol was added from time to time to compensate for the distillate removed. After distilling for 85 minutes the temperature of the vapors was about 100° C. A vacuum of 25 inches of mercury was then applied and the distillation continued for 1 hour more. Xylene was added to the lacquer solution which was then filtered.

Example 2

289 parts of a 50% solution of formaldehyde stabilized with 7% melamine, 100 parts of butanol and 1 part of $H_3PO_4$ were mixed and heated to 70° C. 101 parts of urea were then added slowly over a period of 1 hour to the mixture which was maintained at a temperature between 70–80° C. 200 parts of butanol were then added very slowly over a period of 30 minutes at a temperature of 85° C. Heating at 85° C. was continued for 1 hour more. The reaction vessel was then arranged for distillation and an azeotropic mixture of water and butanol were distilled off, additional butanol being added from time to time during the dehydration. The distillation was completed under a vacuum of 25 inches of mercury as in Example 1. The finished resin had a solids content of 60.5% which was cut to 50% by the addition of xylene. The lacquer so produced had a viscosity of 0 on the Gardner-Holdt scale and had a mineral spirits tolerance of 10:1.

In general, we prefer to use 2.2 to 2.4 moles of formaldehyde for each mole of urea in our process. We may use as little as 1.8 moles of formaldehyde for each mole of urea but unless very carefully controlled the resin solution may prematurely gel. By using a mixture of thiourea with urea we are enabled to still further reduce the ratio of the formaldehyde to the urea mixture without troublesome gel formation.

As will also be apparent to those skilled in the art we may add to our lacquers plasticizers and other modifying agents such as butyl phthalate, castor oil, glycerine, camphor, borneol, gum acacia, sucrose, casein, gelatin, dyes and lakes, pigments, fillers, thinners, etc. The properties of the lacquer film may also be enhanced by the addition to the lacquer of other resinous materials, natural or synthetic, such as the alkyd, phenol and melamine resins or rosin, cumar, dammar and the like, or cellulosic ethers and esters. Obviously many modifications and variations may be made in the process and compositions described above without departing from the spirit and scope of the invention as defined in the appended claims.

What we claim is:

1. A method of preparing lacquers of low viscosity which comprises reacting one mole of urea with 2.2 to 2.4 mols of an aqueous methanol-free solution of formaldehyde containing 50% by weight of formaldehyde stabilized with 6–10% by weight of melamine dissolved therein, heating at refluxing temperatures with a water-immiscible primary mono-hydric alcohol at a pH between 2.0 and 6.0 and thereafter dehydrating the resin solution by removing and condensing the azeotropic distillate, separating the resulting water-immiscible layer of the condensate from the aqueous layer and returning it to the resin solution during the early stages of the dehydration.

2. A method of preparing lacquers of low viscosity which comprises reacting one mole of urea with 2.2 to 2.4 mols of an aqueous methanol-free solution of formaldehyde containing 50% by weight of formaldehyde stabilized with 6–10% by weight of melamine dissolved therein, heating at refluxing temperatures with butanol at a pH between 2.0 and 6.0 and thereafter dehydrating the resin solution by removing and condensing the azeotropic distillate, separating the water-immiscible layer of the condensate containing the butanol from the aqueous layer and returning it to the resin solution during the early stages of the dehydration.

ROBERT C. SWAIN.
PIERREPONT ADAMS.